US00RE37653E

(19) United States
(12) Reissued Patent
Anderson

(10) Patent Number: US RE37,653 E
(45) Date of Reissued Patent: Apr. 16, 2002

(54) GRAIN DRYER MODULE

(75) Inventor: George E. Anderson, Champlin, MN (US)

(73) Assignee: Crown Iron Works Company, Roseville, MN (US)

(21) Appl. No.: 09/391,655

(22) Filed: Sep. 7, 1999

Related U.S. Patent Documents

Reissue of:
(64) Patent No.: 5,884,416
Issued: Mar. 23, 1999
Appl. No.: 08/891,562
Filed: Jul. 11, 1997

U.S. Applications:
(60) Provisional application No. 60/021,587, filed on Jul. 11, 1996.

(51) Int. Cl.[7] ..... F26B 11/12
(52) U.S. Cl. ..... 34/169; 34/170
(58) Field of Search ..... 34/165, 168, 169, 34/170, 172, 174

(56) References Cited

U.S. PATENT DOCUMENTS 3,824,705 A * 7/1974 Ives ..... 34/175
4,499,669 A * 2/1985 Haeck ..... 34/166
4,869,162 A * 9/1989 Schouten ..... 34/168
5,167,081 A 12/1992 Loyns ..... 34/170

OTHER PUBLICATIONS

Buhler AG brochure; SIROCCO Hot Air Dryers; Aug. 1996.

* cited by examiner

*Primary Examiner*—Pamela Wilson
(74) *Attorney, Agent, or Firm*—Nawrocki, Rooney & Sivertson, P.A.

(57) ABSTRACT

A module used with a granular material dryer, such as a grain dryer. The module includes an outer wall, at least one channel and at least one outlet aperture. The channel is positioned relative to the wall such that the channel is in fluid communication with heated air otherwise passing through the dryer. The outlet aperture is in communication with a suction mechanism. Finally, the channel is associated with the outlet aperture such that the heated air will enter the outlet aperture, via activation of the suction mechanism, whereas the granular material will not occlude the channel of the outer aperture. In one preferred embodiment, the module of the present invention is configured to be insertable with an existing dryer to improve drying efficiency.

5 Claims, 2 Drawing Sheets

GRAIN DRYER MODULE

Matter enclosed in heavy brackets [ ] appears in the original patent but forms no part of this reissue specification; matter printed in italics indicates the additions made by reissue.

CROSS REFERENCE TO COPENDING APPLICATION

This application claims the benefit of U.S. Provisional application Ser. No. 60/021,587, filed Jul. 11, 1996.

TECHNICAL FIELD

The present invention relates broadly to the field of apparatus used for extracting moisture from granular materials. More narrowly, however, it deals with dryers which function to extract moisture from grain as a consequence of vaporization to the moisture resulting from heat transfer as the grain passes downwardly through a plenum or a series of plenum modules. A specific focus of the invention is a module which is insertable in an existing dryer to more efficiently effect the drying process.

BACKGROUND OF THE INVENTION

Various apparatus have been used for drying granular materials. Such apparatus are particularly useful in treating grains such as oats, rapeseed and soybeans. Moisture is removed to process a valuable foodstuff and to maximize the period of time over which the grain can be stored.

Proper processing is facilitated in other ways also. The objectives previously discussed can also be obtained, in some measure, by thermal treatment of the grain.

Depending upon the particular grain, a number of effects can be achieved. Moisture removal and heat treatment can have the effect of deactivating fat-reducing enzymes. This results in lengthening the storability of the grain. In some cases, the treatment results in the removal of bitter tastes and brings out, more effectively, pleasing flavor and aroma.

Grains, when properly treated, are heated generally evenly over a desired period of time. The time over which heating occurs is dependent upon capacity of the treating apparatus and other factors. Heating can be maintained, if desired, for several hours by regulating the rate of flow of the grain through a treating apparatus. Product temperatures can be elevated up to approximately 130° C.

One apparatus used for drying, for example, oats has been developed by Buhler-Miag. The apparatus design employs a plurality of modules stacked vertically to define a vertically-elongated processing plenum. The grain is introduced in the uppermost module, and it passes downwardly, through a plenum formed by the stacked modules, to an egress aperture controlled by appropriate apparatus. Introduction of grain into the apparatus, proximate the top end thereof, is coordinated with discharge of the grain from the bottom so that the device is maintained in a substantially full disposition at all times.

The grain moves through the various modules as it passes downwardly through the column of interconnected modules. The time to which the grain is exposed to thermic treatment is governed by a number of factors, including the volume of grain in the apparatus and the flow rate of the product downwardly.

Each module employs a plurality of rows of staggered closed ducts extending across the modules. Staggering of the ducts in adjacent rows facilitates an even heating of the grain. The ducts are closed in cross-section, and the ducts convey steam from an inlet manifold on one side of the module to an outlet manifold on the other side of the module. One type of duct employed in the Buhler-Miag dryer is generally hexagonal in cross-section and of a generally vertically elongated configuration.

The Buhler-Miag dryer varies from other prior art devices with regard to the extent of moisture removed from the grain. Typical, however, of devices of this type known in the prior art is a removal of 0.1–0.2% of the moisture as the temperature of the grain is elevated from between 50° F.–150° F.

It is to these dictates of the prior art and the shortcomings thereof as discussed above that the present invention is directed. It is an improved structure, usable in combination with, for example, a Buhler-Miag dryer to increase the efficiency thereof.

DETAILED DESCRIPTION OF THE INVENTION

Figure 1:
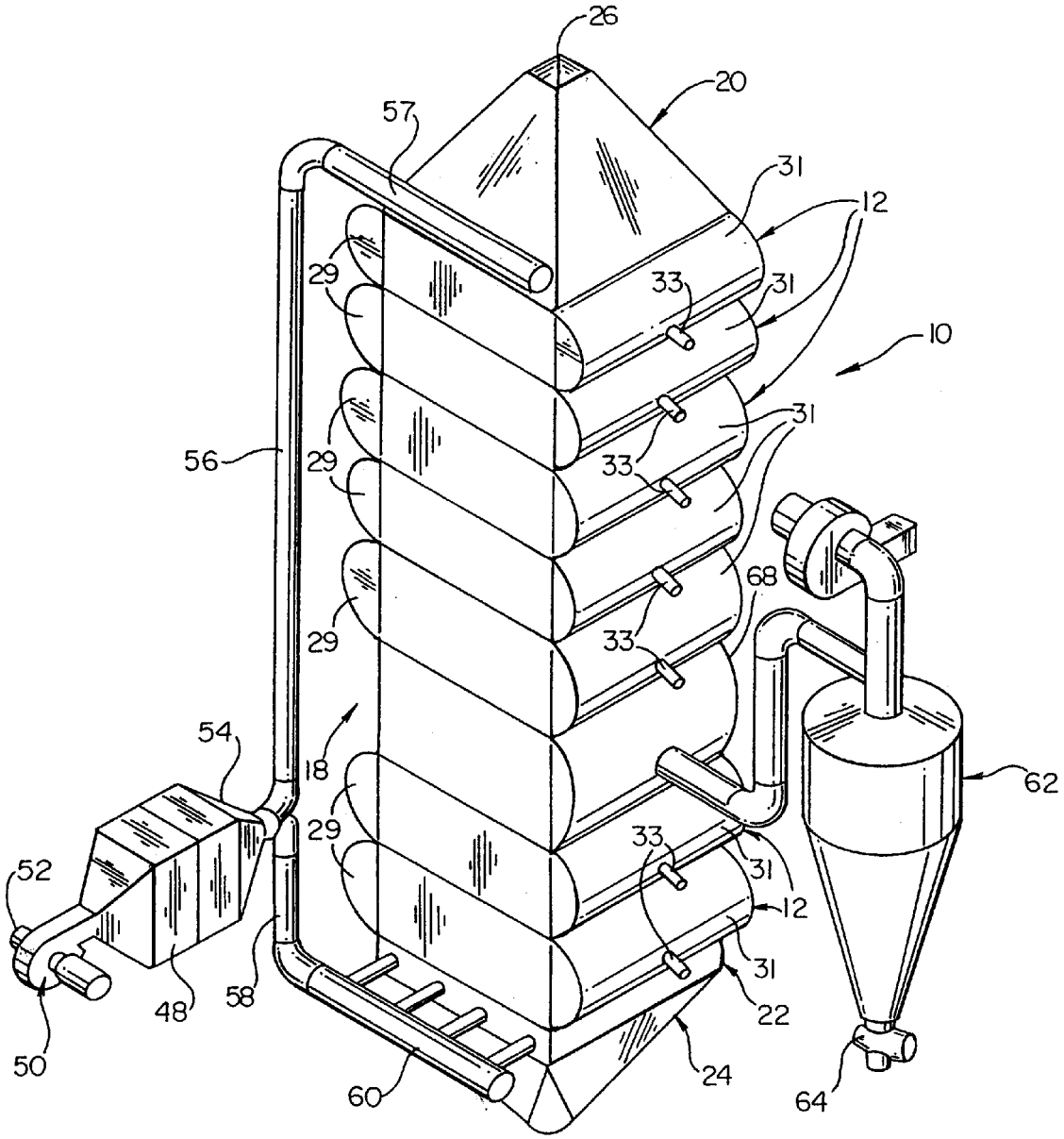
FIG. 1 is a perspective illustration of a drying column employing modules, as known in the prior art, and a module in accordance with the present invention.
Figure 2:
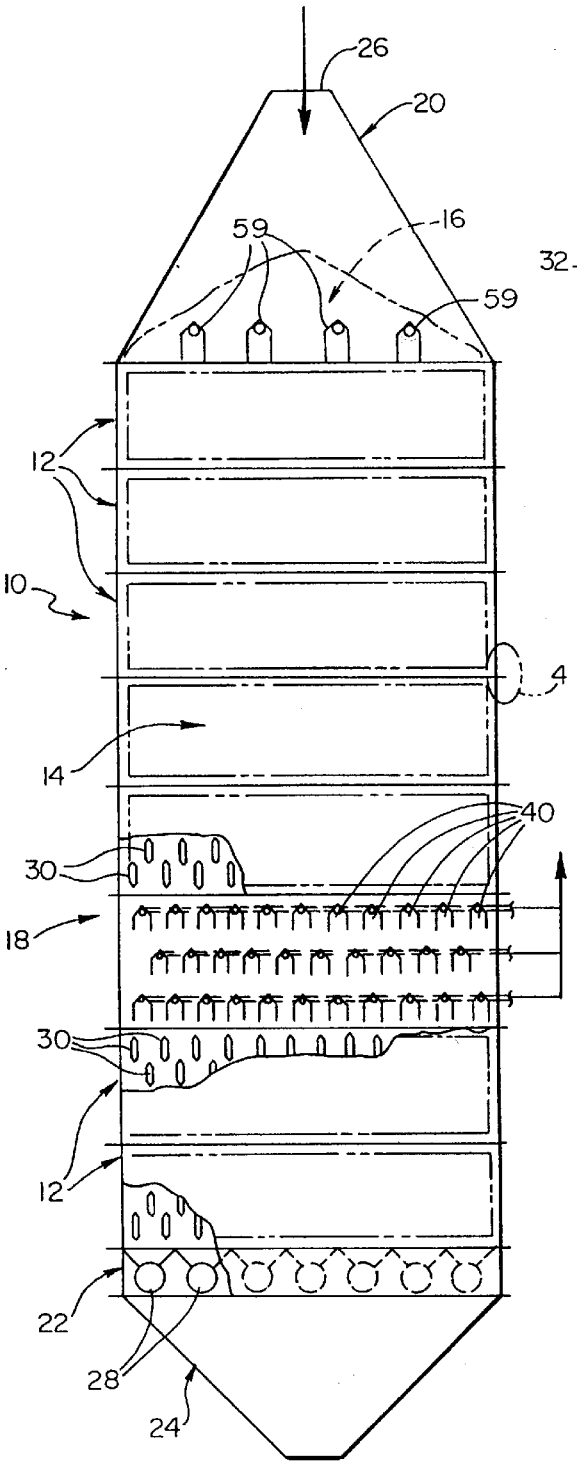
FIG. 2 is a side elevational view of the drying column of FIG. 1, some portions thereof being broken away.
Figure 3:
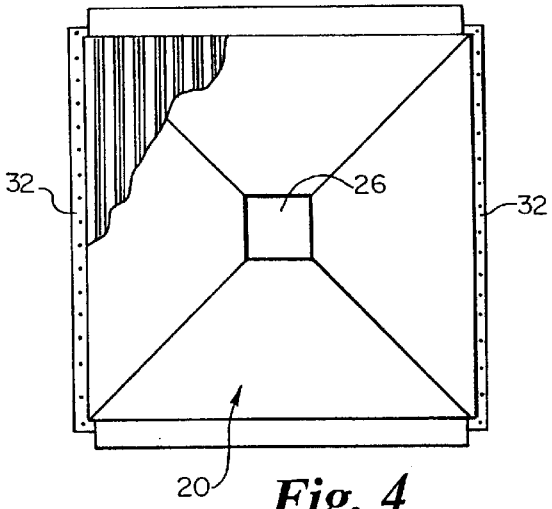
FIG. 3 is a top plan view of the drying column of FIG. 1, some portions thereof being broken away.

Referring now to the drawings wherein like reference numerals denote like elements through the several views, FIGS. 1, 2, and 3 illustrate a grain drying column 10 employing the present invention. The column 10 employs a plurality of modules 12, as known in the prior art, which define a plenum 14 through which grain 16 passes vertically downwardly through the column 10. Also included (shown third from the bottom in FIG. 2) is a special module 18 in accordance with the present invention as will be discussed hereinafter. The modules 12, 18 can vary in their vertical dimension, but a typical vertical dimension for a module is on the order of approximately three feet. Since the column 10 illustrated in FIGS. 1 and 2 includes eight total modules, its vertical height would be on the order of twenty-four feet plus the vertical dimension of each of an ingress truncated pyramid section 20 at the top of the column 10, a rotary valve section 22 below the treating modules, and an inverted egress, truncated pyramid section 24 at the bottom of the column 10. It is not uncommon for the total vertical dimension of the column 10 to be on the order of approximately thirty feet.

As previously discussed, the column 10 includes a generally truncated pyramidal section 20 at the top of the column 10 which functions to receive grain from a feed source (not shown). The grain 16 is deposited through an aperture 26 at the top of the pyramidal section 20 and, eventually, fills the plenum 14 defined by the mated modules. The bottom of the plenum 14 is defined by a floor comprising one or more rotary valves 28 which can be operated to afford egress to the grain 16 after it has been processed in the plenum 14. FIG. 2 illustrates seven separate rotary valves 28 at the bottom of the plenum 14.

After grain 16 has been passed through the rotary valves 28 in a selective fashion, it is deposited into the inverted egress pyramidal section 24. It can, thereafter, be transferred by appropriate conveying structure (not shown) to a storage site.

A sensor (not shown) can be provided in the ingress pyramidal section 20 in order to measure the location of the upper surface of grain 16 within the processing apparatus. The sensor can, in turn, be coordinated with the rotary valves 28 in order to maintain the grain 16 at a desired level. That is, if the level drops too low, the rotary valve operation will be slowed down so that the level of the grain 16 at the top of the column 10 can be elevated. Conversely, if the level of grain 16 becomes too high, rotary valve operation can be maintained more constant until the level of grain drops.

Figure 5:
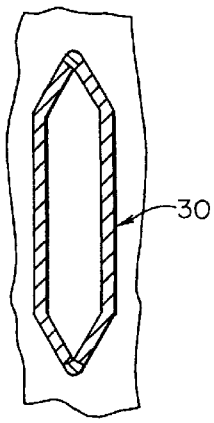
Fig. 5 PRIOR ART
FIG. 5 is a cross-sectional view of a steam duct, as known in the prior art.

The drying and heating modules 12 known in the prior art include a plurality of rows of ducts 30, as best illustrated in FIG. 2. As seen in FIG. 5, each of these ducts 30 can be a closed hexagonal cross-sectioned tube through which steam can be conducted. The steam is heated to a temperature so that, as it is passed through each duct 30, from an inlet manifold 29, through the duct 30, into an outlet manifold 31, and through exit tubes 33, it will elevate the temperature of the grain 16 to a level at which drying and thermic treatment will be facilitated.

The prior art treating modules 12 illustrated in FIG. 2 show arrangement of the ducts 30 wherein ducts 30 in one row are staggered from ducts 30 in an adjacent row. This staggering enables facilitation of heating of the grain 16, since virtually all of the grain 16 will engage multiple ducts 30. Further, each duct typically has a width of approximately one inch and a vertical height of approximately three inches. Such dimensioning is coordinated with the spacing between adjacent ducts 30 in one row and the location of ducts in an adjacent row to further facilitate maximization of heat transfer.

Figure 4:
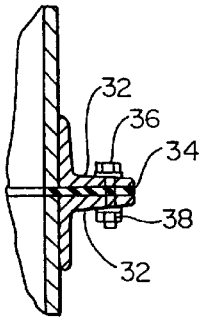
Fig. 4 PRIOR ART
FIG. 4 is an enlarged view of structure circled at "4" in FIG. 2 illustrating means for maintaining adjacent modules securely connected one to another, as known in the prior art.

FIG. 4 illustrates a manner of mating adjacent modules. Each module is defined by a vertical encircling wall, and upper and lower ends of this wall are provided with flanges 32 which, when the modules are properly positioned relative to one another, abut with cooperating flanges of adjacent modules. A seal 34 is inserted between the flanges 32 prior to the time that they are brought into engagement, and the flanges 32 and interposed seal 34 are provided with registered apertures for receiving the shank of a bolt 36. A nut 38 is secured to a distal end of the bolt 36, after it has been passed through corresponding registered apertures, to hold one module in tight engagement with another.

Figure 6:
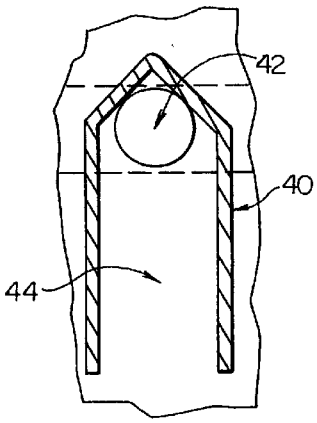
FIG. 6 is a cross-sectional view illustrating a steam-conducting conduit employed in the module in accordance with the present invention.

FIG. 6 best illustrates the construction of channels 40 disposed within the special processing module 18 (that is, the third from the bottom module viewed in FIG. 2). These channels 40 have a construction and orientation similar to the ducts 30 of the prior art modules 12 (that is, as seen in the figures, generally transverse to a direction of passage of particulate material through plenum 14), but the bottom of each such channel 40 is open. As heated air is introduced into the plenum 14 proximate upper and lower ends thereof, it will, as it passes downwardly through the plenum from the upper end and upwardly through the plenum from the lower end seep into channels 40 as it passes through the treating column, and, specifically, through the special module 18. As the heated air passes through the grain 16 in vertically traversing the treating column, it will absorb moisture from, and dry, the grain 16.

A suction mechanism 62 downflow of the drying apparatus, facilitates passage of the treating heated air through an outlet aperture 42 in a wall 44 of the special processing module 18 and into an outlet manifold 68. Thereafter, the heated air will be processed in a manner as will be discussed hereinafter.

Passage of the heated air into, and through, channels 40 will be facilitated because of the suction mechanism downflow of the drying apparatus. Such passage of the heated air will not be occluded through channels 40 in view of the fact that the grain 16 passing through the plenum 14 is passing downwardly. The expected profile of grain flow around channels 40 is best seen in FIG. 6. The heated air passing through the grain 16 into the channels 40 and through apertures 42 into outlet manifold 68 will effectively accomplish drying.

FIG. 1 illustrates a heated air conduction system for use in combination with the treating column. Illustrated is a hot air plenum 48 which is down-flow from a blower 50 having a fan 52 mechanism. Heated air fed into the plenum 14 by the blower 50 is, thereafter, passed through a reducer manifold 54 and into upper and lower feed legs 56, 58 which conduct the heated air to manifolds 57, 60 proximate the top and bottom, respectively, of the column 10. Heated air is fed directly into the plenum 14 by the upper feed leg 56 for passage into manifold 57 and introduction into grain 16 through channels 59 extending across ingress section 20, and, thereafter, downwardly through the grain 16 in the direction of movement of the grain 16 through the plenum 14. Additional inlet manifolds 57 connected at various points along the column 10 may be included. The lower feed leg 58 feeds a manifold 60 for injection of the heated air proximate the lower end of the column 10 and passage in a counter-current direction to the flow of the grain. Heated air thus passing through the plenum 14 is sucked out of the plenum 14 through the special module 18, via channels 40, and into a cyclone 62 where particulate material is removed through a controlled rotary valve 64.

The figures also illustrate inlet and outlet manifolds for each of the prior art modules. These, of course, as discussed hereinbefore, are operated in the same manner as they are in the prior art. That is, heated steam is fed to the inlet manifolds 29 from where it passes through the ducts 30 to the respective outlet manifolds 31. Thereafter, it is reprocessed for subsequent use.

By employment of the special module 18 as described herein, it has been found that efficiency of the dryer can be improved significantly. Where, as previously discussed, prior art dryers remove 0.1–0.2% of the moisture in the column, it is estimated that drying in the range of 1% to 3% should be able to be achieved for many grain or oilseed products when an apparatus modified by employment of the special module described herein is utilized.

It will be understood that this disclosure, in many respects, is only illustrative. Changes may be made in details, particularly in matters of shape, size, material, and arrangement of parts without exceeding the scope of the invention.

What is claimed is:

[1. Apparatus for drying particulate material, comprising:

(a) a wall defining a plenum through which the particulate material passes downwardly and heated gas passed upwardly;

(b) at least one channel, immersed beneath an upper surface of particulate material in said plenum, extending through said plenum generally transversely to a direction of passage of particulate material and heated gas, said at least one channel being in fluid communication with said plenum and having an egress orifice, in alignment therewith, through said wall; and (c) a suction mechanism for taking a vacuum through said orifice.]

*2. Apparatus for drying particulate material, comprising:*

*(a) a wall defining a plenum, having an upper end and a lower end, through which particulate material passes downwardly from said upper end to said lower end and heated gas passed upwardly;*

*(b) at least one channel, immersed beneath an upper surface of particulate material in said plenum and extending through said plenum generally transversely to directions of passage of particulate material downwardly and heated gas upwardly therethrough, said at least one channel being in fluid communication with said plenum and having an egress orifice, in alignment with said channel, through said wall;*

*(c) an upper manifold in communication with said plenum proximate said upper end thereof;*

*(d) a lower manifold in communication with said plenum proximate a lower end thereof;*

*(e) means for introducing a heated gas into said upper and lower manifolds; and*

*(f) a suction mechanism for taking a vacuum through said orifice.*

*3. Apparatus in accordance with claim 2 wherein said means for introducing a heated gas into said upper and lower manifolds comprises a blower driving gas, heated in an external manifold, into feed legs communicating with said upper and lower manifolds.*

*4. Apparatus in accordance with claim 2 wherein said wall comprises a plurality of vertically stacked modules together defining said plenum.*

*5. Apparatus in accordance with claim 4 wherein each of said modules has a vertical dimension of approximately three feet.*

*6. Apparatus in accordance with claim 5 wherein said plenum has a vertical height of at least 20 feet.*

* * * * *